United States Patent [19]

Leiter

[11] 4,337,644
[45] Jul. 6, 1982

[54] GIMBAL ANVIL FOR SEAL FORCE TEST DEVICE

[75] Inventor: L. David Leiter, Willow Grove, Pa.

[73] Assignee: The West Company, Phoenixville, Pa.

[21] Appl. No.: 193,014

[22] Filed: Oct. 2, 1980

[51] Int. Cl.³ .......................... G01M 3/00; G01B 5/02
[52] U.S. Cl. .......................................... 73/52; 73/49.8
[58] Field of Search ............................. 73/52, 49.8, 37

[56] References Cited

U.S. PATENT DOCUMENTS

| | | | |
|---|---|---|---|
| 2,512,134 | 6/1950 | Baule | 73/52 X |
| 3,416,360 | 12/1968 | Ochs | 73/52 |
| 4,306,448 | 12/1981 | Rohde | 73/52 |

Primary Examiner—Charles A. Ruehl
Assistant Examiner—Joseph W. Roskos
Attorney, Agent, or Firm—Eugene E. Renz, Jr.

[57] ABSTRACT

A gimbal-type anvil for apparatus for testing in the integrity of a sealed container closure assembly. These assemblies generally comprise a container, a resilient sealing element mounted in the discharge opening in the container and a cup-like cap engaging over the stopper and seating it in place over the discharge opening in the container. The apparatus includes a force applicator for applying an external force to the cap in a direction to further compress the resilient stopper and a microscope to detect initial displacement of the cap relative to the container when the externally applied force exceeds the residual static force in the stopper. The gimbal-type anvil is operatively associated with the force applicator and consists of a housing and at least a pair of annular ring members pivotally connected to the housing about axes transverse to the longitudinal axis of the container closure assembly. The intersection of the pivot axes of the rings of the anvil define a pivot point disposed closely adjacent a feeler wall which engages the cap to apply a displacement force in the direction opposing the residual static force in the stopper.

5 Claims, 4 Drawing Figures

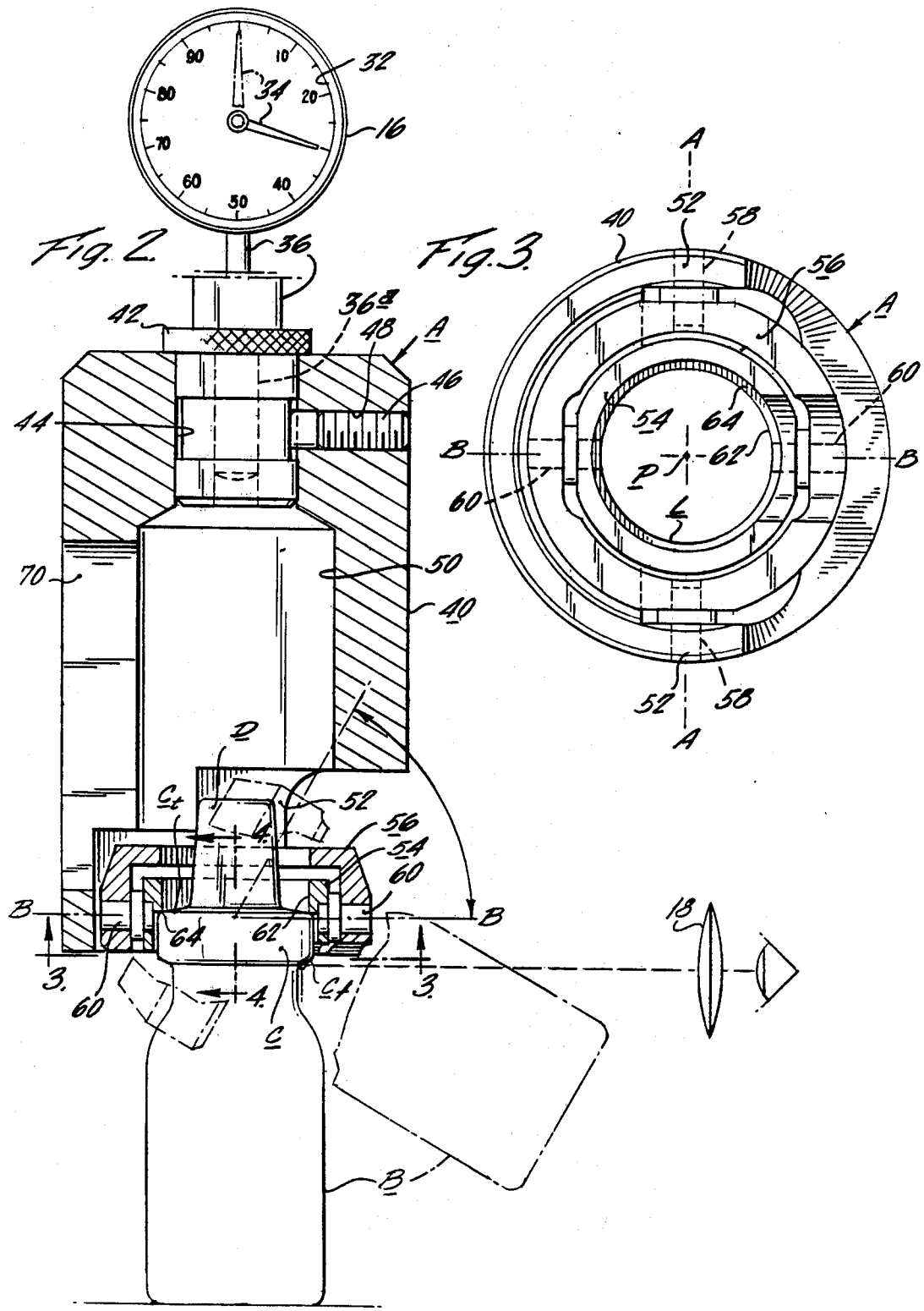

GIMBAL ANVIL FOR SEAL FORCE TEST DEVICE

BACKGROUND OF THE INVENTION

The present invention relates to apparatus and system for determining the integrity of sealed containers. The invention relates more specifically to a novel gimbal-type anvil for systems and devices of this type.

The broad field of the invention has application to parenteral pharmaceutical products which are typically packaged in rigid glass containers sealed with a combination rubber and metal closure. These products are usually packaged on high speed automatic filling and capping equipment. Specifically the containers are filled with a medicament at a filling station and thereafter the closure assembly consisting generally of a resilient sealing element made of rubber and a cup-like cap made of aluminum is placed over the discharge end of the container. The capping apparatus then acts to apply a predetermined force to the cap to seat the closure and to crimp the lower edge of the skirt of the cap under or around the bottle finish or flange to seal the container. In this capping operation, the resilient sealing element is compressed between the end face of the container and the cap and held in a compressed state by crimping the cap to the container. The integrity and adequacy of the seal, therefore, is primarily a function of the percent compression of the sealing element or expressed another way, the magnitude of the sealing force of the seal against the container around the periphery of the opening in the container. Proper sealing for medicaments is important to prevent exposure to air or loss by evaporation and also to protect the contents from microbiological or other contamination.

It has been found that some containers packaged in this way are not adequately sealed. Hence, it is desirable to provide means for checking the adequacy of the seal and rejecting those containers which are not properly sealed. Apparatus and system for checking seal integrity for this purpose is shown and described in a pending application in the name of L. David Leiter and Jacob Ravn owned by The West Company, assignee of the present application, entitled APPARATUS, METHOD AND SYSTEM FOR DETERMINING THE INTEGRITY OF SEALED CONTAINERS filed May 12, 1980 and bearing Ser. No. 148,694 which issued as U.S. Pat. No. 4,315,327 on Feb. 16, 1982. This application is incorporated herein by reference. Recapping briefly the operation of the system disclosed therein, the apparatus includes means for applying a gradually increasing external force to the metal cap of the sealed container-closure assembly which at some point will equal and then exceed the residual static force in the resilient sealing element. External force is applied to a localized area of the cap along a circumferential line adjacent the juncture of the top and skirt in the zone of maximum compression of the resilient sealing element by an anvil. When this force threshold is crossed, the metal outer cap will begin to move downward as the resilient sealing element is further compressed slightly by the additional load from the applied force. The system further includes means for detecting the initial downward movement of the metal cap and observing the value of the force applied at that instant which essentially equals the residual static force in the resilient sealing element. Then, if the residual static force exceeds a predetermined minimum force to provide an adequate seal as determined empirically for a given container-closure assembly, the seal is satisfactory and if below the acceptable minimum, then, of course, the seal is of inadequate integrity and the container-closure assembly is rejected. The type of anvil illustrated in the Leiter et al application, Ser. No. 148,694, comprises a stem and an anvil head which may be assembled to the actuator arm or shaft of the force applicator unit by a simple threading of the stem to a threaded stud at the lower terminal end of the actuator shaft. The lower end of the stem is a universal fitting which has a pocket for mounting a ball defining a pivot point located on the longitudinal axis of the container-closure assembly and spaced upwardly from the feeler wall defined in the anvil head which engages the peripheral edge of the cap along a circular line approximately at the vertical center line of its corner radius. This anvil is primarily for use with closures which have a flat top since the wall portion of the anvil head overlies and is spaced closely to the top when the feeler wall engages the outer peripheral portion thereof along the circular line L. Thus, the anvil is not suited for closures of the type illustrated herein which have a projection extending upwardly from the top of the cap. Moreover, it has been found that when the anvil is used on small-sized closures it has a tendency to cock and transmit a lateral force to the cap since the pivot point is located above the plane of the feeler wall which engages the top of the cap. This produces inaccurate force readings and may result in accepting container-closures which are in fact inadequately sealed.

The present invention provides a novel gimbal-type anvil for use in seal integrity checking systems of the general type described above and is characterized by novel features of construction and arrangement so that closures having projections or the like can be accommodated. Furthermore, the pivotal arrangement of the cooperating ring members forming part of the anvil acts in a way to produce levelling because of a more optimum location of the pivot point relative to the plane of the feeler wall which engages the cap thus eliminating the tendency to cock which produces lateral forces which in turn may produce inaccurate force readings. More specifically, the gimbal-type anvil of the present invention is a two axis gimbal anvil which essentially distributes the force applied to the sealed container more evenly on the cap minimizing the tendency of the cap to tilt when the external force is applied and thereby produce inaccurate readings.

Accordingly, it is an object of the present invention to provide a new and useful two-axis gimbal-type anvil for use in apparatus and system for checking seal integrity of sealed containers which distributes the applied force more evenly to the cap element of the closure so that the force readings may be checked more accurately.

Another object is to provide an anvil which is of comparatively simplified design and is easy and economical to manufacture.

A still further object of the present invention is to provide an anvil which is not only useful with a specialized closure assembly for containers but may also be effectively used to provide accurate readings on a variety of closure elements for containers.

Still another object of the present invention is to provide a gimbal-type anvil for apparatus and system for checking seal integrity which minimizes the chance of error even when utilized by operators with minimal skills.

DESCRIPTION OF THE DRAWINGS

The above and other objects of the present invention and the various features and details of the operation and construction thereof are hereinafter more fully set forth with reference to the accompanying drawings, wherein:

FIG. 2 is an enlarged transverse sectional view of the anvil, the broken line position illustrating the manner of insertion of the container-closure assembly;

FIG. 3 is a view taken on lines 3—3 of FIG. 2; and

DESCRIPTION OF THE PREFERRED EMBODIMENT

Figure 1:
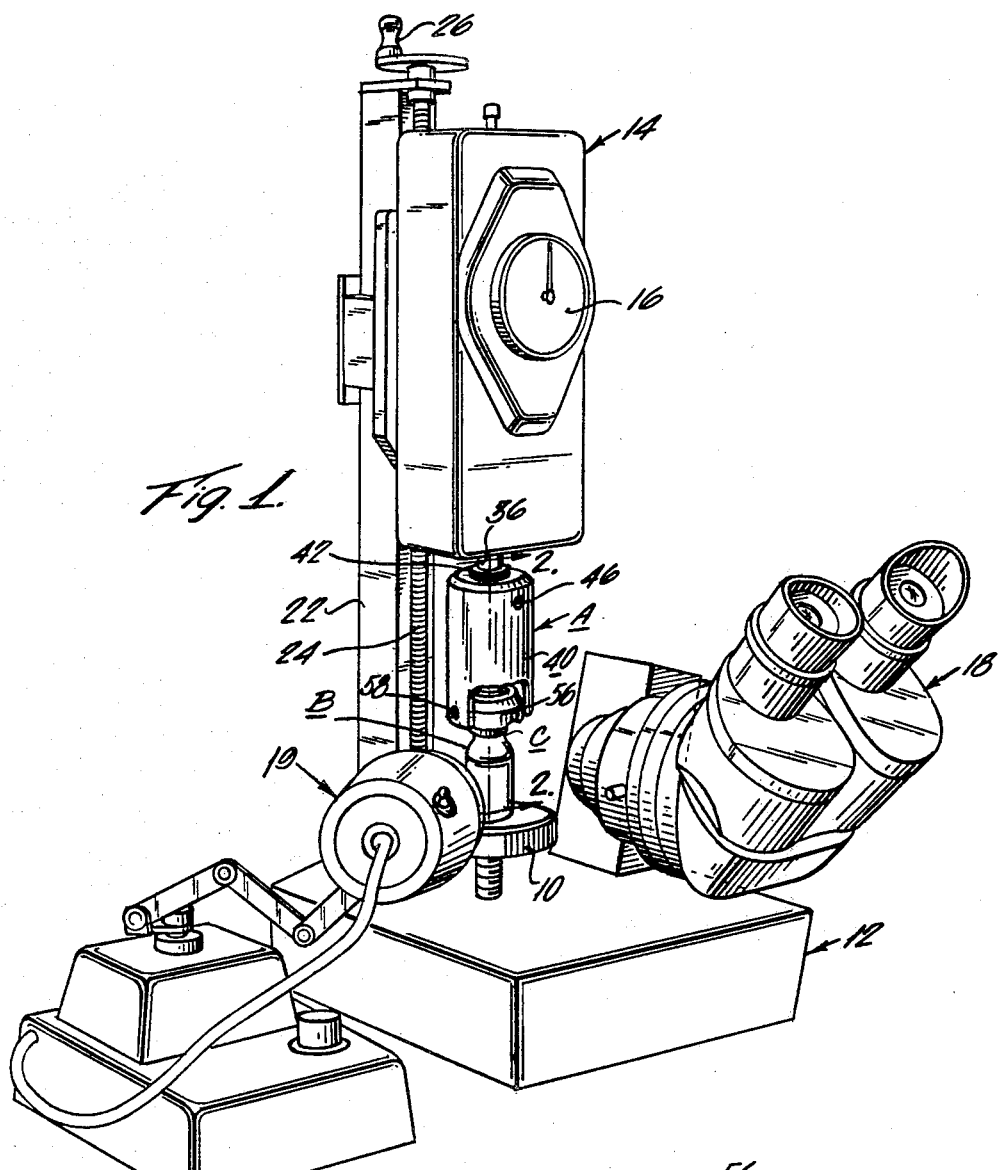
FIG. 1 is a perspective view of a seal force test apparatus incorporating a gimbal-type anvil in accordance with the present invention.

The gimbal-type anvil of the present invention is shown in apparatus and system for checking seal integrity for a medicament package or the like and is in overall detail and operation similar to that described in the pending Leiter et al application Ser. No. 148,694 referred to above. Recapping briefly, however, the basic structural details of the apparatus and system illustrated in terms of function, a sealed container-closure assembly is placed on the base 10 of a test stand 12 and then an external compressive force is applied to the cap C through a manually operated mechanical force applicator 14 including a force gauge 16 for measuring applied force and a gimbal-type anvil A engaging the cap C along a circular line L approximately at the vertical center line of its corner radius in the manner illustrated in FIG. 4. As the external force $F_e$ is being applied, the crimped flange $C_f$ of the cap is observed by means of indicia means, in the present instance, a microscope 18, to determine initial downward displacement of the cap relative to the neck of the glass bottle just behind it in the microscope's view field. A light source 19 illuminates the cap area to facilitate better observation of the cap through the microscope during the test procedure. At the point of initial displacement of the cap C, the operator terminates application of the externally applied force $F_e$ via the mechanical force gauge and notes the force on the dial of the force gauge. The force shown on the indicator dial is substantially equal to the residual static force $F_s$ of the resilient sealing element. The residual static force $F_s$ in the resilient sealing element and the force $F_3$ between the crimped return flange $C_f$ of the cap and container are equal in the sealed container for equilibrium. When the externally applied force $F_e$ displaces the outer cap C downwardly to disengage the crimped flange $C_f$ from the container finish, the force $F_3$ between the crimped flange $C_f$ and the container finish decreases to zero and therefore, the externally applied force $F_e$ is equal to the residual static force $F_s$ in the resilient sealing element.

As noted above the residual static force $F_s$ in the resilient sealing element is then compared to a predetermined force developed empirically for adequate seal tightness to accept or reject the sealed container-closure assembly under test. The system, therefore, provides a simple and easy means for validation of the sealing operation.

Even though the gimbal-type anvil A of the present invention has application to various types of container-closure assemblies, it has particular application for a package of the type illustrated including a bottle B, a resilient sealing element S such as rubber engaging over the discharge opening in the bottle and a metal cap C having an annular top $C_t$ and a peripheral skirt $C_s$ made of thin gauge aluminum so the lower edge of the skirt can be crimped or rolled to form a return flange $C_f$ engaging under the bottle finish to maintain the sealing element S in a compressed state. The closure further includes a dome D or the like which projects upwardly from the top $C_t$ of the cap C to facilitate removal of the cap and stopper as a unit by a tilting action which deforms and releases the crimped lower edge of the skirt $C_s$ from the bottle finish.

Considering now the more specific details of the seal force testing apparatus in accordance with the present invention; the test stand 12 includes an upstanding vertical support column 22 on which the mechanical force applicator unit 14 is mounted. The force applicator unit 14 is adapted for vertical adjusting movement. In the present instance, the means for actuating the force applicator unit 14 comprises a threaded shaft 24 rotatable manually by a crank 26, the force applicator unit 14 having a conventional slide mechanism to mesh with the threaded shaft 24 for displacement in a vertical direction upon rotation of the hand crank. The force applicator unit 14 is of generally conventional design including a graduated dial face 32, a rotatably mounted indicator needle 34 which sweeps the face of the dial and an actuator arm or rod 36 projecting from the lower terminal end of the force gauge 16 which is displaceable and connected by internal mechanism to the indicator needle 34.

Figure 4:
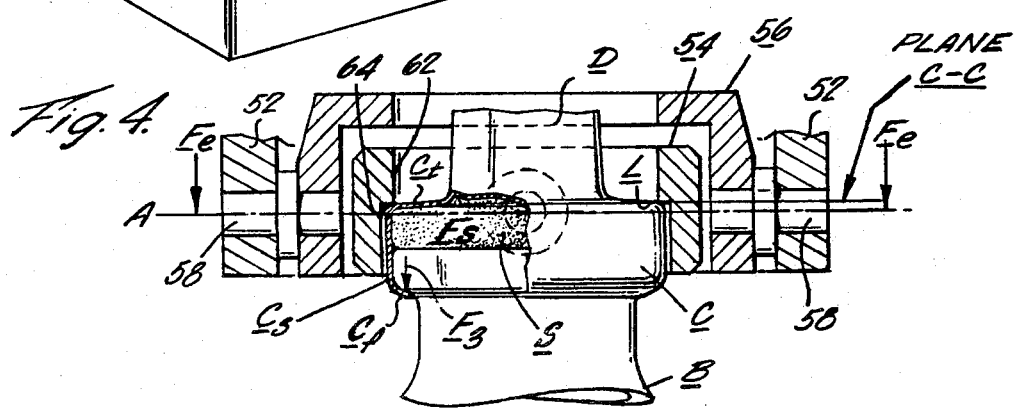
FIG. 4 is an enlarged sectional view of the pivotal ring members forming part of the gimbal-type anvil.

Considering now the details of the gimbal-type anvil A of the present invention and with particular reference to FIGS. 2 and 4, the anvil comprises a generally cylindrical elongated body portion or housing 40 adapted to be secured to the threaded stud 36a on the actuator arm or rod 36, in the present instance, by means of an adaptor insert 42 which has internal threads to mate with the threaded stud 36a. The adaptor insert 42 is rotatably mounted in an opening 44 in the top of the housing so that when the adaptor is bottomed out on the threaded stud 36a, the housing may be rotated and positioned in a proper position in the stand by means of a set screw 46 engaging in a threaded bore 48 in the side wall of the housing to secure the housing against rotation relative to the adaptor. The anvil housing 40 has an enlarged central cavity 50 providing a chamber in which the projection of the closure nests during the seal integrity test operation in the manner illustrated in FIG. 2. The housing includes a pair of depending confronting diametrically opposed lug projections 52 for pivotally mounting a pair of annular inner and outer ring members 54 and 56. The outer ring member 46 is pivotally mounted by trunnions 58 to the lug projections for rotation about an axis A—A. The inner ring member 54 which nests in the outer ring member 56 is pivotally connected by pins 60 to the outer ring member for rotation about an axis B—B extending 90° to the rotational axis A—A. The inner ring member as illustrated has a feeler wall 62 of stepped configuration defining a shoulder 64 which engages the top of the cap along a circular line L approximately at the vertical center line of a corner radius in the manner illustrated in FIG. 4. In the present instance, the axes A—A and B—B are parallel to the plane C—C of the feeler wall. Note that the intersection of the axes A—A, and B—B defines a combined pivot point P which in the illustrated preferred embodiment is located below the plane C—C of the feeler wall a distance designated Δh. The pivot point P is preferably located closely adjacent the plane C—C of the feeler wall 62 on either side thereof and in this manner minimize the lateral force effect of the externally applied load to thereby effect substantially true axial displacement of the cap even if the cap is mounted on the container in a slightly cocked attitude. Thus, all points on the lower edge of the skirt $C_s$ are essentially displaced simultaneously when the external force $F_e$ exceeds the residual static force $F_s$ of the sealing element and thus the force reading will be accurate even if the skirt $C_s$ is viewed at only one location. Further, by this arrangement engagement of the inner ring member 54 with the top $C_t$ of the cap C produces a uniform transmission of forces from the anvil to cap eliminating the possibility of the externally applied load producing a lateral force on the cap which would tend to produce inaccurate readings. The housing as illustrated has an oval-shaped slot 70 in the rear portion thereof so that when the ring members are pivoted upwardly at an angle of about 45° to facilitate insertion of a container into the anvil for test purposes, the projecting portion of the container engages through the oval-shaped slot 70 and then when the ring members are rotated to seat the container on the test stand, there is sufficient clearance so that the closure projection nests in the main chamber 50 of the housing.

Consider now a complete cycle of operation and assume the closures are the type illustrated herein which may be assembled to containers automatically by capping equipment available commercially from The West Company under the trademark WESTCAPPER. This apparatus includes a capping head for seating the cap and compressing the resilient sealing element S and then crimping the lower edge of the skirt under the finish or flange on the container. Now in order to test the sealed container for seal integrity, the proper cap anvil A for the container-closure assembly to be tested is selected and assembled to the threaded stud 36a of the actuator arm of the force applicator unit 14 in the manner described above. Note that the adaptor insert is first bottomed on the threaded stud 36a and then the housing adjusted so that the oval-shaped slot faces rearwardly. The set screw 46 is then threaded into the bore 48 in the housing to engage the adaptor insert 42 and lock the housing against further rotation. The operator then rotates the annular ring members upwardly at an angle of about 45° for ease of entry of insertion of the closure of the container-closure assembly into the opening in the inner ring and then simply rotates the rings downwardly so the container rests on the stand in the manner shown in FIG. 1. Adjustments are made so the microscope is trained and focuses in the area of the lower edge of the return flange $C_f$ of the cap C as shown schematically in FIG. 2. The operator then starts applying the external force through the crank 26 to advance the force applicator unit 14 downwardly while continuously observing the area of the lower edge of the cap through the microscope 18. Note that during this operation the pivotal arrangement of the ring members of the anvil tend to uniformly distribute the applied force on the top of the cap and ensure a uniform application of the external force $F_e$ along the circular line L producing essentially a true axial displacement of the cap relative to the container which is important for achieving accurate readings. At some point during the application of the externally applied force $F_e$, specifically where the externally applied force $F_e$ exceeds the force between the cap C and the container, the cap C is displaced downwardly relative to the neck of the glass bottle just behind it and the microscope's view field and at that instance the operator discontinues rotation of the hand crank 26 and observes the force recorded on the force gauge's dial 32. This force then is essentially equal to the residual static force $F_s$ in the resilient sealing element and is the basis for comparison to an empirically developed minimum or range to accept or reject a given container-closure assembly.

While a particular embodiment of the present invention has been illustrated and described herein, it is not intended to limit the invention and changes and modifications may be made therein within the scope of the following claims.

I claim:

1. A gimbal-type anvil for a seal force test apparatus for checking the integrity of sealed container-closure assemblies including means for applying an external force to the assembly in a direction to compress the resilient sealing element of the assembly comprising a housing adapted to be mounted on the force applying means of the apparatus and at least a pair of annular ring members pivotally connected to said housing about axes transverse to the longitudinal axis of the container-closure assembly, the intersection of said pivotal axes defining a pivot point disposed closely adjacent a feeler wall formed in one of said ring members which engages the cap to apply a displacement force in a direction opposing the residual static force in the resilient sealing element.

2. An anvil as claimed in claim 1 wherein said pivot point lies below the plane of the feeler wall relating to the direction of the external force.

3. An anvil as claimed in claim 1 wherein said ring members comprise an outer ring pivotally connected to the housing about a first pivot axis and any inner ring nested in said outer ring and pivotally connected thereto about a second pivot axis, said axes being in a common plane, said feeler wall formed on the inner circumferential face of said inner ring member.

4. An anvil as claimed in claim 1 wherein said housing has a hollow chamber open to said ring members to accommodate a projection formed as part of the closure.

5. The combination comprising an apparatus for testing the integrity of a sealed container-closure assembly consisting of a container a resilient sealing element and a cup-like cap having a top and depending skirt compressing said sealing element over the discharge opening in the container, said apparatus including means for applying an external force to the cap in a direction to further compress said resilient sealing element, and indicia means to detect initial displacement of said cap relative to said container when the externally applied force exceeds the residual static force in said sealing element, a gimbal-type anvil operatively associated with the external force applying means comprising a housing and at least a pair of annular ring members pivotally connected to said housing about axes transverse to the longitudinal axis of the container-closure assembly, the intersection of said pivotal axes defining a pivot point disposed closely adjacent a feeler wall formed in one of said ring members which engages the cap to apply a displacement force in a direction opposing the residual static force in the resilient sealing element.

* * * * *